United States Patent
Mengoli

(10) Patent No.: US 6,796,571 B2
(45) Date of Patent: Sep. 28, 2004

(54) HYDRAULIC STEERING DAMPER FOR MOTOR VEHICLES

(75) Inventor: Gianluigi Mengoli, Maddalena di Budrio (IT)

(73) Assignee: Ducati Motor Holding S.p.A., Bologna (IT)

( * ) Notice: Subject to any disclaimer, the term of this patent is extended or adjusted under 35 U.S.C. 154(b) by 0 days.

(21) Appl. No.: 10/225,375

(22) Filed: Aug. 21, 2002

(65) Prior Publication Data

US 2003/0062229 A1 Apr. 3, 2003

(30) Foreign Application Priority Data

Oct. 2, 2001 (EP) ............................................. 01830621

(51) Int. Cl.[7] ............................................. B62K 21/08
(52) U.S. Cl. ........................ 280/272; 280/276; 280/279; 74/551.1; 188/307
(58) Field of Search ................................. 280/272, 276, 280/279; 74/551.1–551.8; 188/294, 296, 307–309

(56) References Cited

U.S. PATENT DOCUMENTS

| | | | |
|---|---|---|---|
| 4,736,962 A | 4/1988 | Motrenec | 280/272 |
| 4,773,514 A | 9/1988 | Gustafsson | 188/306 |
| 5,305,858 A * | 4/1994 | Haga et al. | 188/271 |
| 5,492,033 A | 2/1996 | Hopey | 74/551.1 |
| 5,697,122 A * | 12/1997 | Okabe et al. | 16/82 |
| 6,121,526 A * | 9/2000 | Kobori et al. | 188/291 |

FOREIGN PATENT DOCUMENTS

| | | |
|---|---|---|
| EP | 0 695 683 A1 | 2/1996 |
| JP | 07165148 | 6/1995 |

OTHER PUBLICATIONS

European Search Report relating to European Application No. EP 01 83 0621.7–1264–.

* cited by examiner

Primary Examiner—Lesley D. Morris
Assistant Examiner—L. Lum
(74) Attorney, Agent, or Firm—Fay, Sharpe, Fagan, Minnich & McKee, LLP

(57) ABSTRACT

A hydraulic steering damper (9) is designed to be fitted inside a steering sleeve (3) between the steering sleeve (3) itself and a steering pin (2) that is coaxial with the sleeve (3) and having an axis of rotation (A). The damper (9) includes a cylindrical lining (11), that can be fixed to the steering sleeve (3), and a cylindrical wall (13), that can be fixed to the steering pin (2). The lining (11) and the wall (13) form between them a gap (16) designed to hold a hydraulic fluid (17) and divided into a first and a second chamber (28, 29), which are in fluid communication with each other through a conduit (30). The damper (9) further includes a blade (25) attached to the cylindrical wall (13) and designed to push the fluid (17) from one to the other of the chambers (28, 29) when the steering pin (2) is rotated relative to the steering sleeve (3).

11 Claims, 3 Drawing Sheets

HYDRAULIC STEERING DAMPER FOR MOTOR VEHICLES

BACKGROUND OF THE INVENTION

The present invention relates to a steering damper, especially for motor vehicles.

The steering mechanism of a motor vehicle usually has a damping device used to smooth the steering action of the front wheel when the vehicle is travelling in order to improve road stability, and thus vehicle safety, especially at high speeds.

Conventional steering dampers, known in the jargon of the trade as "steering brakes", operate by friction on two matching parts that rotate relative to each other.

In the past, dampers of this kind were mounted at the steering headstock and included a screw with which the rider of the vehicle, by using a knob connected to the screw, could adjust the friction between the parts that were rotating relative to each other. The adjustment was performed according to the number of road curves and the speed at which the vehicle was travelling.

These frictional dampers have two major disadvantages, namely quick wear and the need to be continually adjusted by the rider. The need for continual adjustment may also give rise to hazardous situations in that to adjust the damper, the rider loses concentration and temporarily takes his/her mind off the road.

Subsequently, hydraulic dampers of linear type were developed. These consist of a tube and a stem, one connected to the frame and the other integral with the steering system.

These dampers, however, have the disadvantage of being bulky and not easy to fit in with the other parts of the motor vehicle. They are therefore built onto the vehicle like a separate add-on and usually hamper routine maintenance operations.

Another type of hydraulic damper taught by prior art is a damper built into the steering headstock of a motor vehicle. This type of damper, although it overcomes the above mentioned disadvantages, brings another disadvantage in that the essential parts of it that ensure its correct operation are located between and act directly on the steering headstock and steering pin.

Thus, any maintenance on the steering headstock means also completely dismantling the steering damper. This in turn requires the time-consuming task of draining the hydraulic fluid.

SUMMARY OF THE INVENTION

The present invention therefore has for an object to overcome all the disadvantages mentioned above by providing a steering damper that is at once functional, practical, economical and easy to construct.

BRIEF DESCRIPTION OF THE DRAWINGS

The technical characteristics of the invention, with reference to the above aims, are clearly described in the claims below and its advantages are apparent from the detailed description which follows, with reference to the accompanying drawings which illustrate a preferred embodiment of the invention provided merely by way of example without restricting the scope of the inventive concept, and in which:

DESCRIPTION OF THE PREFERRED EMBODIMENTS

Figure 1:
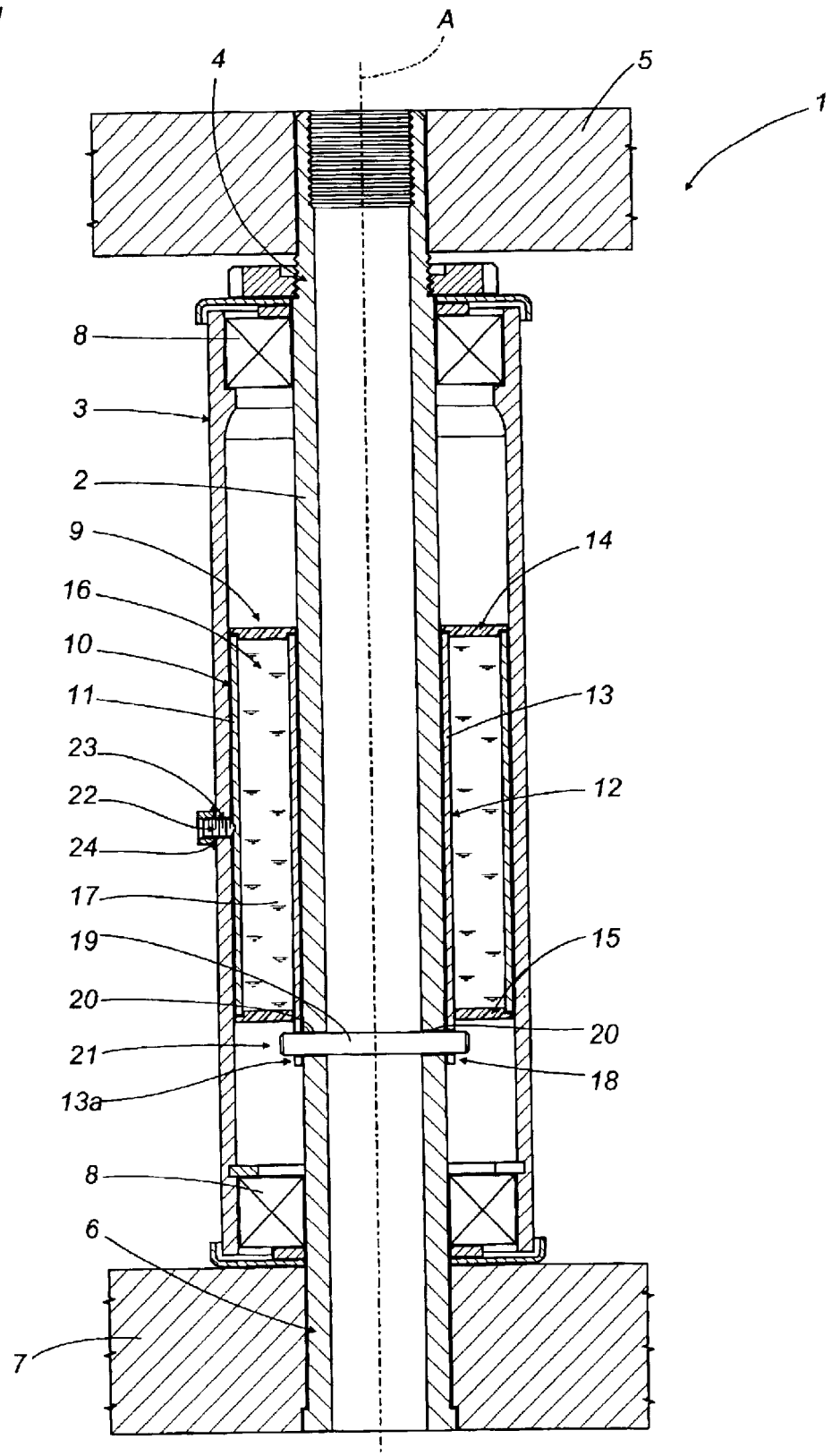
FIG. 1 is a schematic front view of a part of a motor vehicle equipped with the steering damper according to the present invention.

With reference to FIG. 1, the numeral 1 denotes in its entirety the zone of a motor vehicle where the steering is connected to the vehicle frame.

The connection zone 1 comprises a tubular steering pin 2 inserted coaxially into a steering sleeve 3 that is integral with the above mentioned motor vehicle frame that is not illustrated.

The steering 2, whose axis of rotation is labeled A, is connected at an upper end of it 4 to a steering headstock 5, and at a lower end of it 6 to a bottom steering yoke 7.

The steering pin 2 can turn in the steering sleeve about the axis of rotation A.

The turning motion of the steering pin 2 within the steering sleeve 3 is accomplished by conventional bearings 8, located close to the upper and lower ends 4, 6 of the pin 2. These bearings are illustrated schematically in FIG. 1 and not further described.

The stems and tubes (not illustrated) of the telescopic suspensions of the motor vehicle's front wheel are mounted on either side of the steering pin 2 and parallel to it on the steering headstock 5 and bottom yoke 7.

The vehicle's steering gear (not illustrated) is usually mounted on the headstock 5 and acts on the above mentioned front wheel (not illustrated) in a customary manner and therefore not described in any detail.

The connection zone 1 comprises a hydraulic steering damper 9 positioned inside the steering sleeve 3.

Figure 2:
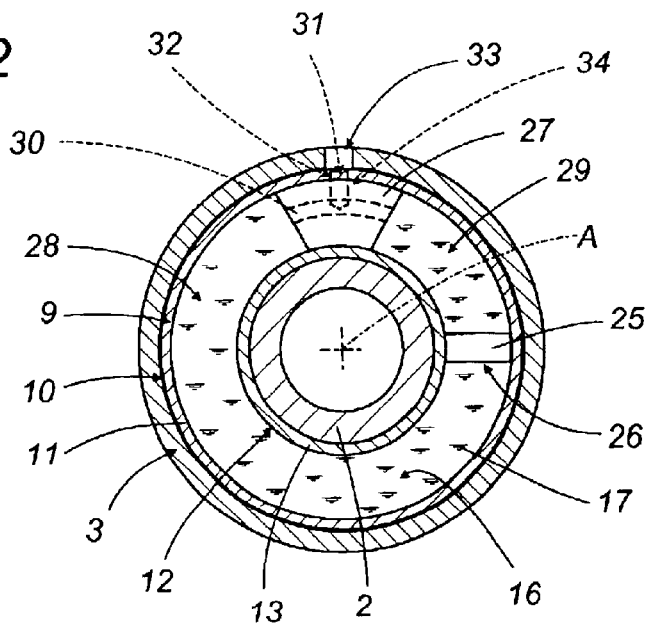
FIG. 2 is a section view from above of a detail from FIG. 1.

With reference to FIG. 2, the steering damper 9 comprises an outer first portion 10 with a cylindrical lining 11 and an inner second portion 12 with a cylindrical wall 13.

The cylindrical wall 13 and the cylindrical lining 11 are coaxial with each other and with the steering pin 2.

The cylindrical wall 13 and the cylindrical lining 11 are rotatably connected to each other by two closing elements 14, 15, respectively upper and lower, having the shape of rings and designed to provide a fluid-tight seal.

The cylindrical wall 13, cylindrical lining 11 and the two closing elements 14, 15 form a gap 16 which holds a hydraulic fluid 17.

With reference to FIG. 1, a lower end 13a of the cylindrical wall 13 has formed on it a protrusion 18, extending outside the gap. The protrusion 18 engages a cross pin 19 in such a way as to lock the cylindrical wall 13 to the steering pin 2 to prevent relative rotational or translational motion between the two parts.

The cross pin 19 passes through two coaxial through holes 20 made in diametrically opposite sides of the steering pin 2.

The cross pin 19 and the holes 20 made in the steering pin 2 together constitute means 21 for fixing the cylindrical wall 13 to the steering pin 2 itself.

Again with reference to FIG. 1, a pressure screw 22 is screwed into a threaded hole 23 made in the steering sleeve 3 so as to stably fix the cylindrical lining 11 to the steering sleeve 3 in a customary manner which is not further described, thus preventing relative rotational or translational motion between the two parts.

The screw 22 and the hole 23 in the steering sleeve 3 together constitute means 24 for fixing the cylindrical lining 11 to the steering sleeve 3.

With reference to FIG. 2, the hydraulic steering damper 9 has a blade 25 fixed to the cylindrical wall 13 and extending radially from the wall 13 into the gap 16 and towards the cylindrical lining 11.

The extension of the blade 25 in axial direction (not illustrated) substantially coincides with the axial extension of the gap 16.

The blade 25, actuated by the cylindrical wall 13 as it rotates about the axis A, constitutes means 26 for pushing the hydraulic fluid 17 inside the gap 16.

The hydraulic steering damper 9 further comprises a dividing element 27 attached to the cylindrical lining 11 and extending radially from the cylindrical lining 11 into the gap 16 and towards the cylindrical wall 3.

The dividing element 27 and blade 25 form, in the gap 16, a first and a second chamber, labeled 28 and 29 respectively. The volume of each of the chambers is variable but the sum of the two volumes is always equivalent to the total working volume of the gap 16 that holds the fluid 17.

The dividing element 27 has a conduit 30 which places the first and second chambers 28, 29 in fluid communication with each other.

The conduit 30 is acted upon by a throttle screw 31 for narrowing the conduit 30 itself and which is screwed into a corresponding threaded through hole 32 made in the dividing element 27. An opening 33 made in the steering sleeve 3 and in the cylindrical lining 11 provides access to the throttle screw 31 from the outside of the steering sleeve 3.

The throttle screw 31 constitutes means 34 for adjusting the section of the conduit 30 through which the fluid passes.

Figure 3:
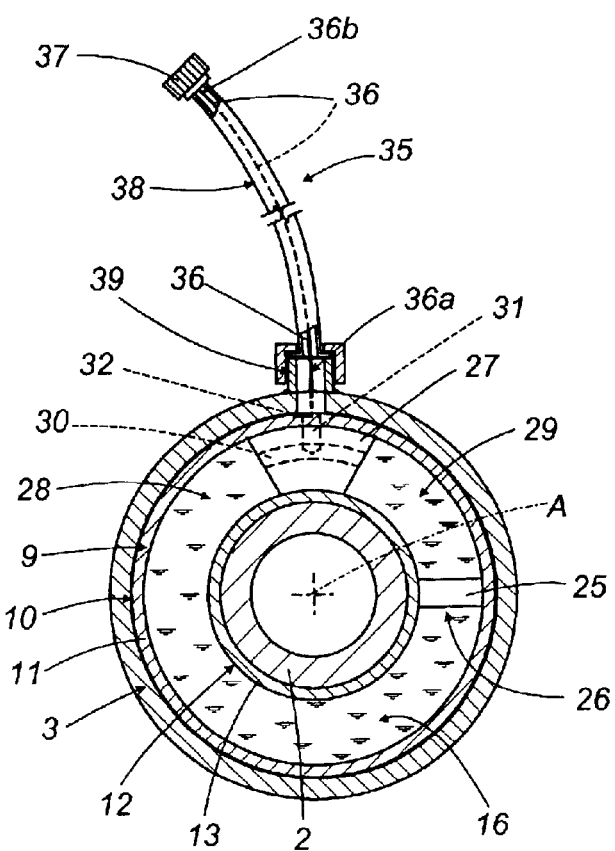
FIG. 3 is a section view from above of another embodiment of the detail shown in FIG. 2.

As illustrated in FIG. 3, the hydraulic damper 9 comprises a flexible element 35 for remotely operating on the throttle screw 31.

The flexible element 35 comprises a metal cable 36 attached, at a first end of it 36a, to the throttle screw 31 and, at a second end of it 36b, opposite the first end 36a, to a hand-operated knob 37, which can be advantageously positioned on the steering gear (not illustrated) of the motor vehicle.

The flexible element 35 further comprises a removable sheath 38 that covers the metal cable 36. The sheath 38 is fixed to a corresponding support 39 connected to the steering sleeve 3 close to the opening 33.

Figure 4:
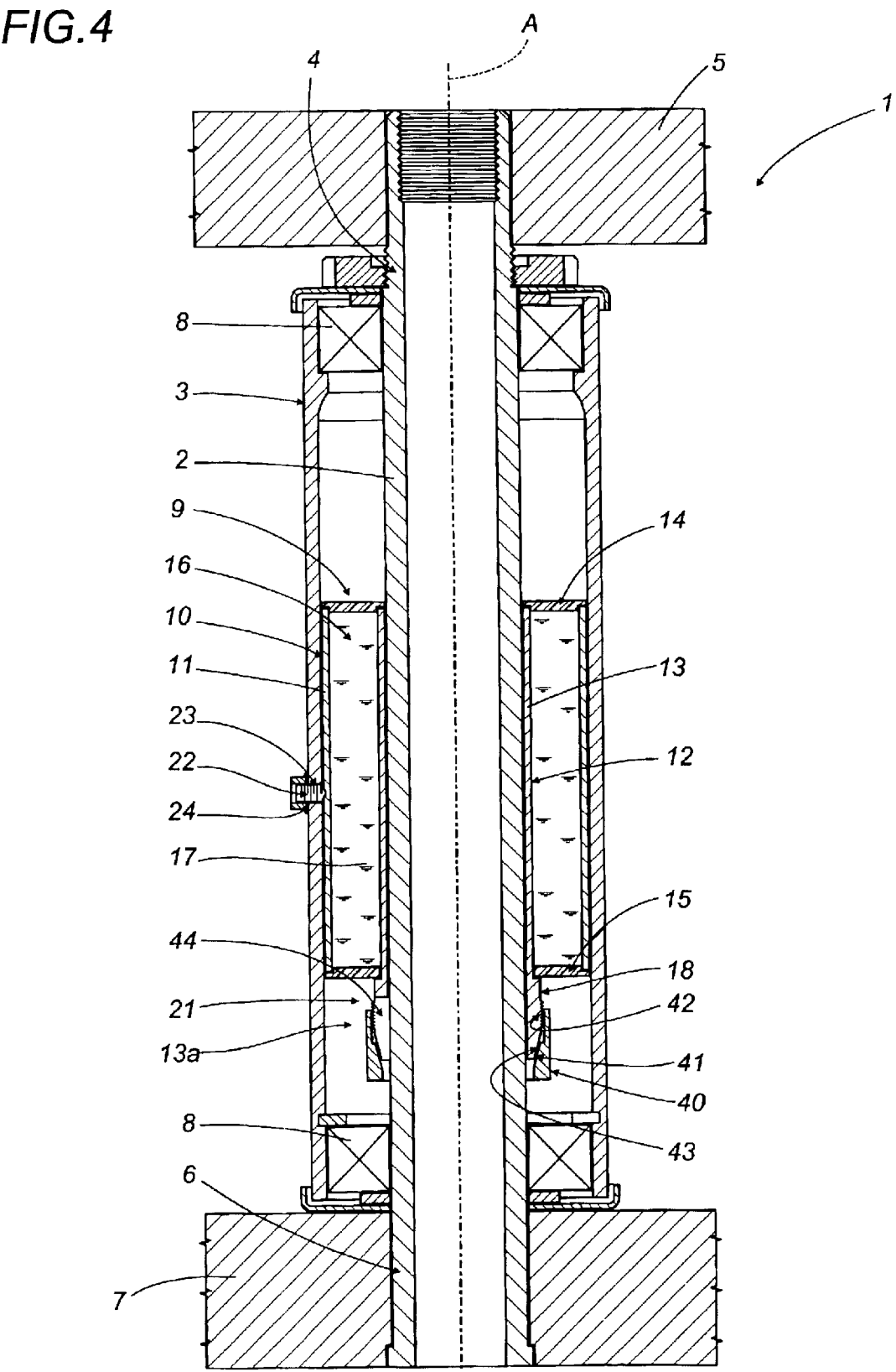
FIG. 4 is a schematic front view of another embodiment of the damper shown in FIG. 1.

In another embodiment of the hydraulic damper 9 illustrated in FIG. 4, the means 21 for fixing the cylindrical wall 3 to the steering pin 2 comprise a ring nut 40 having a tapered portion 41. The ring nut 40 is designed to be screwed onto the protrusion 18 of the cylindrical wall 3 which has an upper threaded first end 42 and a lower tapered second end 43 shaped to match the tapered portion 41 of the ring nut 40.

The protrusion 18 has a plurality of axial slits 44 made in its circular surface at equidistant angular intervals from each other, one of the slits being schematically illustrated in FIG. 4 as a portion without hatching.

The operation of the hydraulic steering damper 9 will now be described with reference to FIG. 1. After its components have been assembled, the hydraulic damper 9 is placed over the steering pin 2, the latter having previously been removed from the steering sleeve 3, and then fixed to the steering pin 2 by inserting the cross pin 19 through the two coaxial holes 20 in the steering pin 2.

Therefore, the cross pin 19, besides constituting the aforementioned means 21 for fixing the cylindrical wall 3, also provides a sure and precise reference for locating the wall 13 relative to the steering pin 2.

Once the cylindrical wall 3 of the hydraulic steering damper 9 has been fixed to the steering pin 2, the pin 2 and the damper 9 are inserted together into the steering sleeve.

Starting from the configuration illustrated in FIG. 1, where the pre-assembled steering damper 9 is mounted inside the steering sleeve 3, any rotation of the steering pin 2 about its axis A causes the blade 25 to push the fluid 17 through the conduit 30.

The passage of the hydraulic fluid 17 through the conduit 30 produces the braking action of the steering damper 9 according to the known principles of internal fluid friction.

Advantageously, the throttle screw 31 can be adjusted to vary the intensity of this braking action. Thus, screwing in the screw 31 reduces the cross section of the conduit 30 for the passage of the fluid 17 and, vice versa, unscrewing the screw 31 increases the cross section for the passage of the fluid 17.

In the embodiment illustrated in FIG. 3, the screw 31 is adjusted by turning the knob 37 which causes the metal cable 36 to be twisted relative to the sheath 38.

Advantageously, every motor vehicle leaving the production and assembly line has the holes 20, 23 and the opening 33 made in it so that the pre-assembled steering damper 9 provided as an optional or standard accessory can be quickly and easily fitted by any user.

In yet another embodiment which is not illustrated, the cross pin 19 is a cotter pin designed to reduce or even eliminate any play that is produced when the protrusion 18 is fixed to the steering pin 2.

The fixing illustrated in FIG. 4 is also designed to eliminate play. Here, the ring nut 40 is screwed onto the matching upper threaded end 42 of the protrusion 18, the lower tapered end 43 of the protrusion 18 having made in it one or more of the aforementioned axial slits 44. The axial slits 44 enable the protrusion 18 to be constricted, at least at its lower tapered end 43, by the encircling pressure exerted on it by the tapered portion 41 of the ring nut 40.

The invention described can be subject to numerous modifications and variations without thereby departing from the scope of the inventive concept. Moreover, all the details of the invention may be substituted by technically equivalent elements.

LIST OF REFERENCE NUMBERS

1 CONNECTION ZONE
2 STEERING PIN
3 STEERING SLEEVE
4 UPPER END OF PIN 2
5 STEERING HEADSTOCK
6 LOWER END OF PIN 2
7 BOTTOM STEERING YOKE
8 BEARINGS
9 HYDRAULIC DAMPER
10 OUTER FIRST PORTION OF 9
11 CYLINDRICAL LINING
12 INNER SECOND PORTION
13 CYLINDRICAL WALL
13a LOWER END
14 UPPER CLOSING ELEMENT

15 LOWER CLOSING ELEMENT
16 GAP
17 HYDRAULIC FLUID
18 PROTRUSION
19 CROSS PIN
20 HOLES IN PIN 2
21 MEANS FOR FIXING THE WALL 13 TO THE PIN 2
22 PRESSURE SCREW
23 THREADED HOLE
24 MEANS FOR FIXING LINING 11 TO SLEEVE 3
25 BLADE
26 PUSHING MEANS
27 DIVIDING ELEMENT
28 FIRST CHAMBER
29 SECOND CHAMBER
30 CONDUIT
31 THROTTLE SCREW
32 THREADED HOLE
33 OPENING IN SLEEVE 3
34 MEANS FOR ADJUSTING CONDUIT 30
35 FLEXIBLE ELEMENT
36 METAL CABLE
36a FIRST END OF CABLE 36
36b SECOND END OF CABLE 36
37 KNOB
38 SHEATH
39 SUPPORT FOR 38
40 RING NUT
41 TAPERED PORTION OF RING NUT 40
42 UPPER THREADED FIRST END OF PROTRUSION 18
43 LOWER TAPERED SECOND END OF PROTRUSION 18
44 AXIAL SLITS IN PROTRUSION 18

What is claimed is:

1. A hydraulic steering damper for a motor vehicle having a frame comprising a steering sleeve (3), a steering pin (2) inserted coaxially into the steering sleeve (3) and connected at an upper end of it (4) to a steering headstock (5), and at a lower end of it (6) to a bottom steering yoke (7), the steering pin (2) being able to turn within the steering sleeve (3) about an axis of rotation (A), wherein the hydraulic steering damper (9) is pre-assembled and ready to be fitted inside the steering sleeve (3) between the sleeve (3) itself and the steering pin (2), said hydraulic steering damper comprising an outer first portion (10) adapted to be secured to the steering sleeve (3) and an inner second portion (12) adapted to be secured to the steering pin (2), wherein said outer first portion (10) and said inner second portion (12) define therebetween a space (16) that contains hydraulic fluid (17) in first and second chambers (28,29) that are in fluid communication with each other through a variable size conduit (30).

2. The damper according to claim 1, comprising means (34) for adjusting the cross section of the conduit (30) for the passage of the fluid (17).

3. The damper according to claim 2, wherein the adjustment means (34) are remotely operated.

4. A hydraulic steering damper for a motor vehicle having a frame comprising a steering sleeve (3), a steering pin (2) inserted coaxially into the steering sleeve (3) and connected at an upper end of it (4) to a steering headstock (5), and at a lower end of it (6) to a bottom steering yoke (7), the steering pin (2) being able to turn within the steering sleeve (3) about an axis of rotation (A), wherein the hydraulic steering damper (9) is pre-assembled and ready to be fitted inside the steering sleeve (3) between the sleeve (3) itself and the steering pin (2), said hydraulic steering damper comprising at least an outer first portion (10) that can be fixed to the steering sleeve (3) and an inner second portion (12) that can be fixed to the steering pin (2), the first and second portions (10, 12) forming between them at least a gap (16) to hold a hydraulic fluid (17), the gap (16) having at least a first and a second chamber (28, 29) which are in fluid communication with each other through a conduit (30) made in a dividing element (27) that is integral with the outer first portion (10).

5. The damper according to claim 4, comprising means (26) for pushing the fluid (17) so as to transfer the fluid (17) from the first chamber (28) to the second chamber (29) and vice versa through the conduit (30).

6. A hydraulic steering damper for a motor vehicle having a frame comprising a steering sleeve (3), a steering pin (2) inserted coaxially into the steering sleeve (3) and connected at an upper end of it (4) to a steering headstock (5), and at a lower end of it (6) to a bottom steering yoke (7), the steering pin (2) being able to turn within the steering sleeve (3) about an axis of rotation (A), the hydraulic steering damper (9) being pre-assembled and ready to be fitted inside the steering sleeve (3) between the sleeve (3) itself and the steering pin (2) and comprising at least an outer first portion (10) that can be fixed to the steering sleeve (3) and an inner second portion (12) that can be fixed to the steering pin (2), the first and second portions (10, 12) forming between them at least a gap (16) to hold a hydraulic fluid (17), the gap (16) having at least a first and a second chamber (28, 29) which are in fluid communication with each other through a conduit (30) made in a dividing element (27) that is integral with the outer first portion (10), wherein the outer first portion (10) includes a cylindrical lining (11), the lining (11) being designed to be placed inside the steering sleeve (3) coaxially with the sleeve (3) itself.

7. The damper according to claim 6, comprising means (24) for fixing the lining (11) to the steering sleeve (3).

8. The damper according to claim 6, wherein the inner second portion (12) comprises a cylindrical wall (13), the cylindrical wall (13) being designed to be fitted coaxially on the steering pin (2), over the outside surface of the pin (2).

9. The damper according to claim 8, further comprising means (21) for fixing the cylindrical wall (13) to the steering pin (2).

10. The damper according to claim 6, comprising means (34) for adjusting the cross section of the conduit (30) for the passage of the fluid (17).

11. The damper according to claim 10, wherein the adjustment means (34) are remotely operated.

* * * * *